(12) United States Patent
Jin et al.

(10) Patent No.: US 8,344,942 B2
(45) Date of Patent: Jan. 1, 2013

(54) SYSTEM AND METHOD FOR RESOLVING AMBIGUITY IN RADAR, LIDAR, AND ACOUSTIC SYSTEMS

(75) Inventors: Michael Yih-Hwa Jin, San Gabriel, CA (US); Chi-Yung Chang, Torrance, CA (US)

(73) Assignee: Raytheon Company, Waltham, MA (US)

( * ) Notice: Subject to any disclaimer, the term of this patent is extended or adjusted under 35 U.S.C. 154(b) by 281 days.

(21) Appl. No.: 12/769,814

(22) Filed: Apr. 29, 2010

(65) Prior Publication Data
US 2011/0267223 A1 Nov. 3, 2011

(51) Int. Cl.
G01S 13/22 (2006.01)
G01S 13/90 (2006.01)

(52) U.S. Cl. ......... 342/137; 342/25 F; 356/5.01; 367/99
(58) Field of Classification Search .................... 342/137
See application file for complete search history.

(56) References Cited

U.S. PATENT DOCUMENTS

| | | | |
|---|---|---|---|
| 3,277,473 A * | 10/1966 | Calhoon, Sr. et al. | ........ 342/195 |
| 3,935,572 A | 1/1976 | Broniwitz et al. | |
| 4,057,800 A | 11/1977 | Ganz | |
| 4,537,502 A * | 8/1985 | Miller et al. | ................. 356/5.11 |
| 4,584,579 A * | 4/1986 | Frost et al. | ..................... 342/189 |
| 4,746,922 A * | 5/1988 | Prenat | .............................. 342/88 |
| 4,954,830 A | 9/1990 | Krikorian et al. | |
| 5,138,322 A | 8/1992 | Nuttall | |
| 5,307,070 A | 4/1994 | Runge et al. | |
| 5,311,183 A | 5/1994 | Mathews et al. | |
| 5,442,359 A * | 8/1995 | Rubin | ........................... 342/109 |
| 5,477,221 A | 12/1995 | Chang et al. | |
| 5,796,364 A * | 8/1998 | Fuchter et al. | .................. 342/99 |
| 6,078,281 A | 6/2000 | Milkovich et al. | |
| 6,492,932 B1 | 12/2002 | Jin et al. | |
| 6,573,982 B1 | 6/2003 | Pruitt | |
| 6,633,253 B2 * | 10/2003 | Cataldo | ...................... 342/25 R |
| 6,911,933 B1 | 6/2005 | Mutz et al. | |
| 7,109,911 B1 * | 9/2006 | Cataldo | ....................... 342/25 R |
| 7,652,614 B2 * | 1/2010 | Venkatachalam et al. | .. 342/26 R |

OTHER PUBLICATIONS

Cho, John Y. N. "Multi-PRI Signal Processing for the Terminal Doppler Weather Radar. Part II: Range-Velocity Ambiguity Mitigation". Journal of Atmospheric and Oceanic Technology. vol. 22. Oct. 2005. pp. 1507-1519.*

(Continued)

Primary Examiner — John B Sotomayor
Assistant Examiner — Matthew M Barker
(74) Attorney, Agent, or Firm — Pierce Atwood LLP; Joseph M. Maraia (57) ABSTRACT

Range and Doppler ambiguities are common in radar, lidar, and acoustic systems. Resolving these ambiguities is important to achieve desirable geolocation and image quality performance in these systems. A new method is described to iteratively resolve the ambiguities. For Doppler ambiguity applications, a first PRF value and an initial Doppler frequency search window are selected. A new PRF is determined based on the ratio of the initial search window to the first PRF. The radar data of the first pair of PRF's is used to determine two modulo Doppler estimates. The modulo Doppler estimates are used to determine a new Doppler estimate with a confidence interval smaller than the first search window. The ratio of the new Doppler search window to the first PRF, is used to determine the next PRF. This process is iterated until the new Doppler search window is less than the first PRF.

18 Claims, 7 Drawing Sheets

OTHER PUBLICATIONS

Ferrari et al. "Doppler Ambiguity Resolution Using Multiple PRF". IEEE Transactions on Aerospace and Electronic Systems. vol. 33, No. 3. Jul. 1997. pp. 738-751.*

Xia, Xiang-gen. "Doppler Ambiguity Resolution Using Optimal Multiple Pulse Repetition Frequencies". IEEE Transactions on Aerospace and Electronic systems. vol. 35, No. 1. Jan. 1999. pp. 371-379.*

Yu et al. "PRF-Ambiguity Resolution for SAR by Contrast Minimization in Range-Doppler Domain". Frontiers of Electrical and Electronic Engineering in China. vol. 2. No. 3. 2007. pp. 302-306.*

Richard Bamler, "Doppler Frequency Estimation and the Cramer-Rao Bound", Journal title: IEEE Transactions on Geoscience and Remote Sensing, May 3, 1991, vol. 29, Issue 3 (7 pages: title page, pp. 385-390).

Curlander et al., "System Design Considerations" (Section 6.52), Journal title: Synthetic Aperture Radar: Systems and signal Processing, 1991 (4 pages: title page, pp. 305-307).

C.Y. Change and J.C. Curlander, "Application of the Multiple PRF Technique to Resolve Doppler Centroid Estimation Ambiguity for Spaceborne SAR", Journal title: IEEE Transactions on Geoscience and Remote Sensing, Sep. 2, 1992, vol. 30, No. 5 (9 pages, pp. 941-949).

Michael Y. Jin, "Optimal Doppler Centroid Estimation for SAR Data from a Quasi-Homogeneous Source", Journal title: IEEE Transactions on Geoscience and Remote Sensing, Nov. 2, 1986, vol. GE-24, No. 6 (4 pages, pp. 941-949).

Merrill I. Skolnik, Research Division, Electronic Communications, Inc. "Introduction to Radar Systems", McGraw-Hill Book Company, Inc. 1962 (5 pages) (Sec. 4.2, pp. 129-131).

Merrill I. Skolnik, Navel Research Laboratory, "Radar Handbook", McGraw-Hill Book Company, Inc. 1970, "Pulse-doppler Radar" by David H. Mooney and William A. Skillman—Westinghouse Electric Corporation, Chapter 19 (31 pages) (pp. 19-1 to 19-29).

George W. Stimson, "Introduction to Airborne Radar", Second Edtion, SCITECH Publishing, Inc. 1998, chapter 12 Pulse Delay Ranging (pp. 151-162), chapter 25 The Crucial Choice of PRF (pp. 325-334), chapter 26 Low PRF Operation (pp. 335-354), chapter 27 Medium PRF Operation (pp. 355-368) and chapter 28 High PRF Operation (pp. 369-382).

Keith M. Chugg, website located at: http://tesla.csl.uiuc.edu/~koetter/ece361/Q-function.pdf, "Q-Function Handout" (pp. 1-4), dated Nov. 19, 1995.

* cited by examiner

SYSTEM AND METHOD FOR RESOLVING AMBIGUITY IN RADAR, LIDAR, AND ACOUSTIC SYSTEMS

FIELD OF THE INVENTION

The present invention relates to systems and methods for resolving ambiguity in the data of radar, lidar and acoustic systems and, in particular, resolving range ambiguity and Doppler ambiguity in radar, lidar and acoustic system data.

BACKGROUND

Signal data in synthetic aperture radar (SAR) systems or synthetic aperture lidar (SAL) systems are often processed to generate a range-Doppler map. In a SAR system, the Doppler centroid (i.e., the Doppler frequency corresponding to the center of the radar beam) is required to optimize the clutter-to-noise ratio (CNR) of the SAR image map and to accurately determine the target location.

Doppler centroid values calculated directly from the ancillary SAR system data may contain significant errors when the azimuth beam width of the system is relatively narrow in comparison with the azimuth beam pointing accuracy. If the errors are within a fraction of the azimuth beam width, the errors have sometimes been resolved by estimating the Doppler centroid from the azimuth spectra of the data.

However, in some systems, the error of the Doppler centroid may be as large as several times the pulse repetition frequency (PRF). This is often the case with, for example, synthetic aperture lidar systems and spaceborne imaging radar systems operating at high frequency bands. In such cases, it is also necessary to account for the Doppler ambiguity. The target location error (TLE) caused by Doppler ambiguity may be significant in some applications. It is often necessary to determine the Doppler ambiguity in SAR and SAL systems to satisfy both CNR and TLE accuracy and performance requirements. A need therefore exists for systems and methods for accurately determining the Doppler and range ambiguity in radar, lidar and acoustic system data.

SUMMARY

Embodiments described herein are generally related to methods and systems for accurately determining target location using a radar, lidar or acoustic (e.g., sonar) system. One embodiment features a method for accurately determining Doppler and/or range ambiguity in radar, lidar and/or acoustic system data to more accurately determine the location of targets.

Range and Doppler ambiguities are common in radar, lidar, and acoustic systems. Resolving these ambiguities is important to achieve desirable geolocation and image quality performance in these systems. A new method is described to iteratively resolve the ambiguities. For Doppler ambiguity applications, a first PRF value and an initial Doppler frequency search window are selected. A new PRF is determined based on the ratio of the initial search window to the first PRF. The radar data of the first pair of PRF's is used to determine two modulo Doppler estimates. The modulo Doppler estimates are used to determine a new Doppler estimate with a confidence interval small than the first search window. The ratio of the new Doppler search window to the first PRF is used to determine the next PRF. This process is iterated until the new Doppler search window is less than the first PRF. Embodiments perform much better than existing methods and systems by providing more flexibility in PRF value selection, allowing better characterization of the estimated ambiguity number, and because they are suitable to all search window sizes.

Another embodiment features a method for estimating a range ambiguity parameter value ($N_{PRI}$) of a target for a radar, lidar, or acoustic system. The method includes determining a statistical variation parameter value ($\sigma_{r^1}$) of an initial range estimate $r^1$ of a target for a radar, lidar, or acoustic system. The method also includes determining k pulse repetition interval values (PRI) for the radar, lidar, or acoustic system. The method also includes determining a range estimate ($r^k$) for each of the k PRI values based on a k–$1^{th}$ range estimate ($r^{k-1}$) of the k–$1^{th}$ PRI value and modulo range estimates ($\bar{r}_1$ and $\bar{r}_k$) determined from radar, lidar, or acoustic system data sets acquired for pulse repetition interval values $PRI_1$ and $PRI_k$.

In some embodiments, the method includes determining the range ambiguity parameter value ($N_{PRI}$) based on at least the $k^{th}$ range estimate ($r^k$) and $1^{st}$ pulse repetition interval value ($PRI_1$). In some embodiments, the method includes determining the range ambiguity parameter value ($N_{PRI}$) in accordance with equation:

$$N_{PRI} = \text{floor}\left(\frac{r^k}{PRI_1}\right).$$

In some embodiments, determining the $k^{th}$ pulse repetition interval ($PRI_k$) values includes calculating the k pulse repetition interval (PRI) values in accordance with equation:

$$PRI_k = N_k\left(\frac{PRI_1}{N_k + 1}\right),$$

for each value of k, until $2N_\sigma \sigma_{r^k} < PRI_1$, where, $$N_k \geq 2N_\sigma \frac{\sigma_{r^{k-1}}}{PRI_1}$$

and $N_k < N_{k-1}$, $$\sigma_{r^k} = \left(\sqrt{\left(1 + \frac{1}{N_k}\right)^2 + 1}\right)N_k \sigma_{\bar{r}},$$

and $\sigma_{\bar{r}}$ is a measurement error.

In some embodiments determining the $k^{th}$ range estimate ($r^k$) is calculated in accordance with equation:

$$r^k = pN_k PRI_1 + r^{k-1}, \text{ where,}$$

$$p = -\frac{1}{2} + \text{mod}\left[\frac{\bar{r}_k}{PRI_k} - \frac{\bar{r}_1}{PRI_1} - \text{bias}, 1\right], \text{ and}$$

$$\text{bias} = \frac{\text{mod}\left[r^1 - \frac{N_k}{2}PRI_1, N_k PRI_1\right]}{N_k PRI_1}$$

Another embodiment features a method for estimating a Doppler ambiguity parameter value ($N_{PRF}$) of a target for a radar, lidar, or acoustic system. The method includes determining a statistical variation parameter value ($\sigma_{f_d^1}$) of an initial Doppler estimate $f_d^1$ of a target for a radar, lidar, or acoustic system. The method also includes determining k pulse repetition frequency values (PRF) for the radar, lidar, or acoustic system. The method also includes determining a Doppler estimate ($f_d^k$) for each of the k PRF values based on a k–1$^{th}$ Doppler estimate ($f_d^{k-1}$) of the k–1$^{th}$ PRF value and modulo Doppler estimates ($\bar{f}_1$ and $\bar{f}_k$) determined from radar, lidar, or acoustic system data sets acquired for pulse repetition frequency values $PRF_1$ and $PRF_k$.

In some embodiments, the method includes determining the Doppler ambiguity parameter value ($N_{PRF}$) based on at least the k$^{th}$ Doppler estimate ($f_d^k$) and 1$^{st}$ pulse repetition frequency value ($PRF_1$). In some embodiments, the method includes determining the Doppler ambiguity parameter value ($N_{PRF}$) in accordance with equation:

$$N_{PRF} = \text{floor}\left(\frac{f_d^k}{PRF_1}\right).$$

In some embodiments, determining the k$^{th}$ pulse repetition frequency ($PRF_k$) values includes calculating the k$^{th}$ pulse repetition frequency ($PRF_k$) values in accordance with equation:

$$PRF_k = N_k\left(\frac{PRF_1}{N_k + 1}\right),$$

for each value of k, until $2N_o\sigma_{f_d^k} < PRF_1$, where, $$N_k \geq 2N_\sigma \frac{\sigma_{f_d^{k-1}}}{PRF_1}$$

and $N_k < N_{k-1}$, $$\sigma_{f_d^k} = \left(\sqrt{\left(1 + \frac{1}{N_k}\right)^2 + 1}\right) N_k \sigma_f,$$

and $\sigma_f$ is a measurement error value.

In some embodiments, determining the k$^{th}$ Doppler estimate ($f_d^k$) is calculated in accordance with equation:

$$f_d^k = pN_k PRF_1 + f_d^{k-1}$$

where $$p = -\frac{1}{2} + \text{mod}\left[\frac{\bar{f}_k}{PRF_k} - \frac{\bar{f}_1}{PRF_1} - \text{bias}, 1\right],$$

and $\text{bias} = \dfrac{\text{mod}\left[f_{dc}^1 - \frac{N_k}{2}PRF_1, N_k PRF_1\right]}{N_k PRF_1}.$ Another embodiment features a method for estimating a Doppler ambiguity parameter value ($N_{PRF}$) for a synthetic aperture imaging system. The method includes determining a statistical variation parameter value ($\sigma_{f_{dc}^1}$) of an initial Doppler centroid estimate $f_{dc}^1$ of a target for a synthetic aperture imaging system. The method also includes determining k pulse repetition frequency values (PRF) for the synthetic aperture imaging system. The method also includes determining a Doppler centroid estimate ($f_{dc}^k$) for each of the k PRF values based on a k–1$^{th}$ Doppler centroid estimate ($f_{dc}^{k-1}$) of the k–1$^{th}$ PRF value and modulo Doppler estimates ($\bar{f}_1$ and $\bar{f}_k$) determined from imaging system data sets acquired for pulse repetition frequency values $PRF_1$ and $PRF_k$.

In some embodiments, the method includes determining the Doppler ambiguity parameter value ($N_{PRF}$) based on at least the k$^{th}$ Doppler centroid estimate ($f_{dc}^k$) and 1$^{st}$ pulse repetition frequency value ($PRF_1$). In some embodiments, method includes determining the Doppler ambiguity parameter value ($N_{PRF}$) in accordance with equation:

$$N_{PRF} = \text{floor}\left(\frac{f_{dc}^k}{PRF_1}\right).$$

In some embodiments, the method includes determining the k pulse repetition frequency ($PRF_k$) values including calculating the k pulse repetition frequency ($PRF_k$) values in accordance with equation:

$$PRF_k = N_k\left(\frac{PRF_1}{N_k + 1}\right),$$

for each value of k, until $2N_o\sigma_{f_{dc}^k} < PRF_1$, where $$N_k \geq 2N_\sigma \frac{\sigma_{f_{dc}^{k-1}}}{PRF_1}$$

and $N_k < N_{k-1}$, $$\sigma_{f_{dc}^k} = \left(\sqrt{\left(1 + \frac{1}{N_k}\right)^2 + 1}\right) N_k \sigma_f,$$

and $\sigma_f$ is a measurement error value.

In some embodiments, the synthetic aperture imaging system is a radar system, lidar system, or acoustic system. In some embodiments, the method includes determining the k$^{th}$ Doppler centroid estimate ($f_{dc}^k$) is calculated in accordance with equation:

$$f_{dc}^k = pN_k PRF_1 + f_{dc}^{k-1}, \text{ where,}$$

$$p = -\frac{1}{2} + \text{mod}\left[\frac{\bar{f}_k}{PRF_k} - \frac{\bar{f}_1}{PRF_1} - \text{bias}, 1\right], \text{ and}$$

$$\text{bias} = \frac{\text{mod}\left[f_{dc}^1 - \frac{N_k}{2}PRF_1, N_k PRF_1\right]}{N_k PRF_1}.$$

Another embodiment features a synthetic aperture imaging system. The system includes a transmitter and a receiver. The system also includes a processor (e.g., synthetic aperture imaging processor) coupled to the receiver and transmitter configured to determine a statistical variation parameter value ($\sigma_{f_{dc}^1}$) of an initial Doppler centroid estimate $f_{dc}^1$ for the synthetic aperture imaging system, determine k pulse repetition frequency values (PRF) for the synthetic aperture imaging system and determine a k$^{th}$ Doppler centroid estimate ($f_{dc}^k$) for each of the k PRF values based on a k–1$^{th}$ Doppler centroid estimate ($f_{dc}^{k-1}$) of the k–1$^{th}$ PRF value and modulo Doppler estimates ($\bar{f}_1$ and $\bar{f}_k$) determined from imaging system data sets acquired for pulse repetition frequency values $PRF_1$ and $PRF_k$.

Another embodiment features a synthetic aperture imaging system. The system includes means for determining a statistical variation parameter value ($\sigma_{f_{dc}^1}$) of an initial Doppler centroid estimate $f_{dc}^1$ for a synthetic aperture imaging system, means for determining k pulse repetition frequency values (PRF) for the synthetic aperture imaging system and means for determining a Doppler centroid estimate ($f_{dc}^k$) for each of the k PRF values based on a k−1 Doppler centroid estimate ($f_{dc}^{k-1}$) of the k−1 PRF value and modulo Doppler estimates ($\bar{f}_1$ and $\bar{f}_k$) determined from imaging system data sets acquired for pulse repetition frequency values $PRF_1$ and $PRF_k$.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed description, taken with reference to the accompanying drawings, in which.

DETAILED DESCRIPTION OF ILLUSTRATIVE EMBODIMENTS

Figure 1:
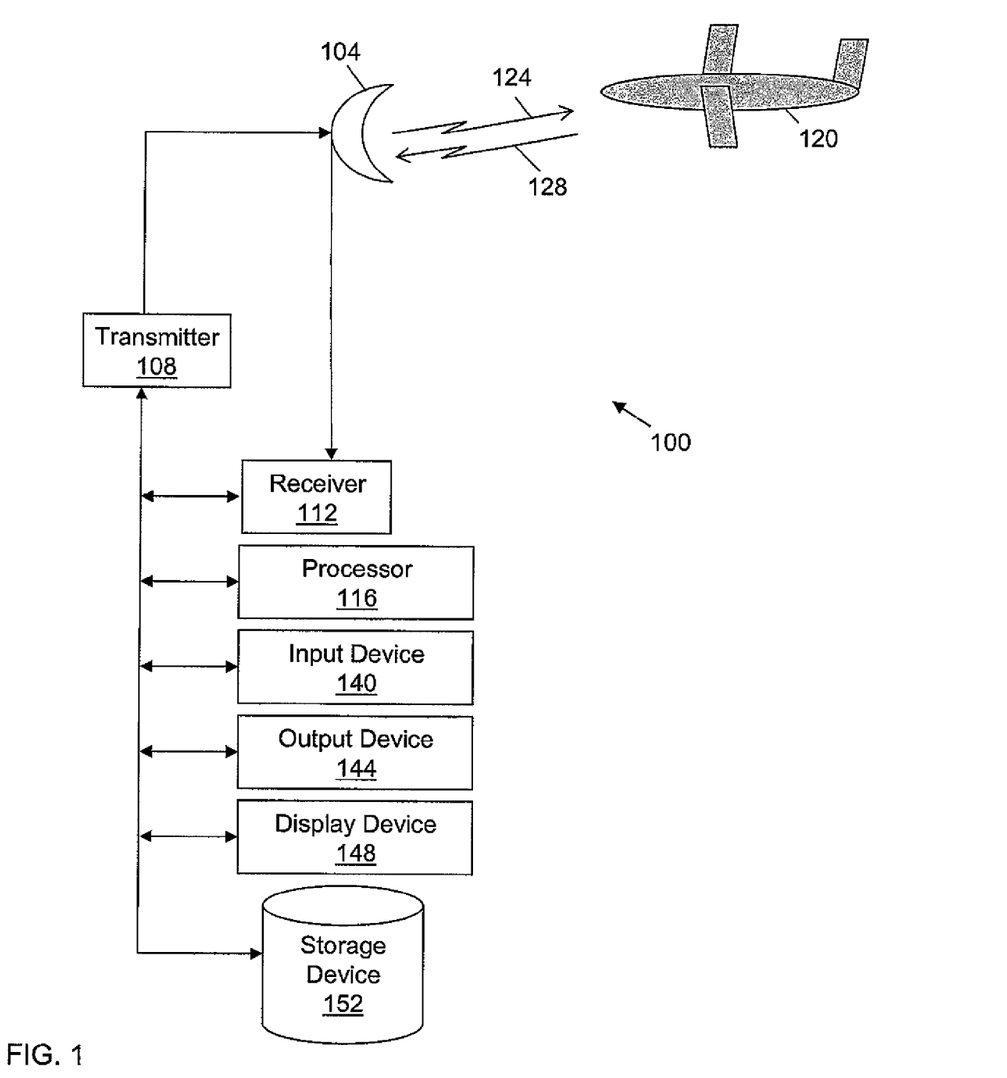
FIG. 1 is a schematic illustration of a synthetic aperture radar (SAR) system, according to an illustrative embodiment.

FIG. 1 is a schematic illustration of a synthetic aperture radar (SAR) system 100, according to an illustrative embodiment. The system 100 includes a processor 116 electrically coupled to a transmitter 108 and a receiver 112. The processor 116 can be, for example, a synthetic aperture imaging processor or other suitable computer processor used in radar systems for controlling operation of a radar system. The transmitter 108 and receiver 112 are coupled to an antenna 104. The processor 116 provides transmission signals to the transmitter 108 which are transmitted by the antenna 104. The transmission signals 124 (e.g., radar transmission signals) are directed towards a target 120 (e.g., aircraft, satellite, vehicle, boat) to, for example, determine the range and velocity of the target relative to the antenna 104. Response signals 128 (e.g., radar response signals reflected back towards the antenna 104 in response to the transmission signals 124 impinging upon the target 120) are received by the antenna 104. The receiver 112 receives the response signals from the antenna 104 and directs the signals to the processor 116.

The processor 116 is configured to process the various system 100 signals to determine, for example, ambiguity parameter values (e.g. range ambiguity parameter values, Doppler centroid parameter values, or Doppler parameter values) of the target 120 for system 100. The processor 116 uses the ambiguity parameter values to determine a more accurate measure of target range and/or Doppler velocity. The processor 116 then determines a more accurate measure of the target range and radial velocity.

The modules and devices described herein can, for example, utilize the processor 116 to execute computer executable instructions and/or include a processor to execute computer executable instructions (e.g., an encryption processing unit, a field programmable gate array processing unit, etc.). It should be understood that the system 100 can include, for example, other modules, devices, and/or processors known in the art and/or varieties of the illustrated modules, devices, and/or processors.

The input device 140 receives information associated with the system 100 (e.g., instructions from a user, instructions from another computing device) from a user (not shown) and/or another computing system (not shown). The input device 140 can include, for example, a keyboard or a scanner. The output device 144 outputs information associated with the system 100 (e.g., information to a printer (not shown), information to an audio speaker (not shown)).

The display device 148 displays information associated with the system 100 (e.g., status information, configuration information). The processor 116 executes the operating system and/or any other computer executable instructions for the system 100 (e.g., sends signals to the transmitter 108 for transmission (transmission signals 124) by the antenna 104, or receives response signals 128 from the antenna 104).

The storage device 152 stores the various information associated with the system 100 and its operation. The storage device 152 can store information and/or any other data associated with the system 110. The storage device 152 can include a plurality of storage devices. The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 2:
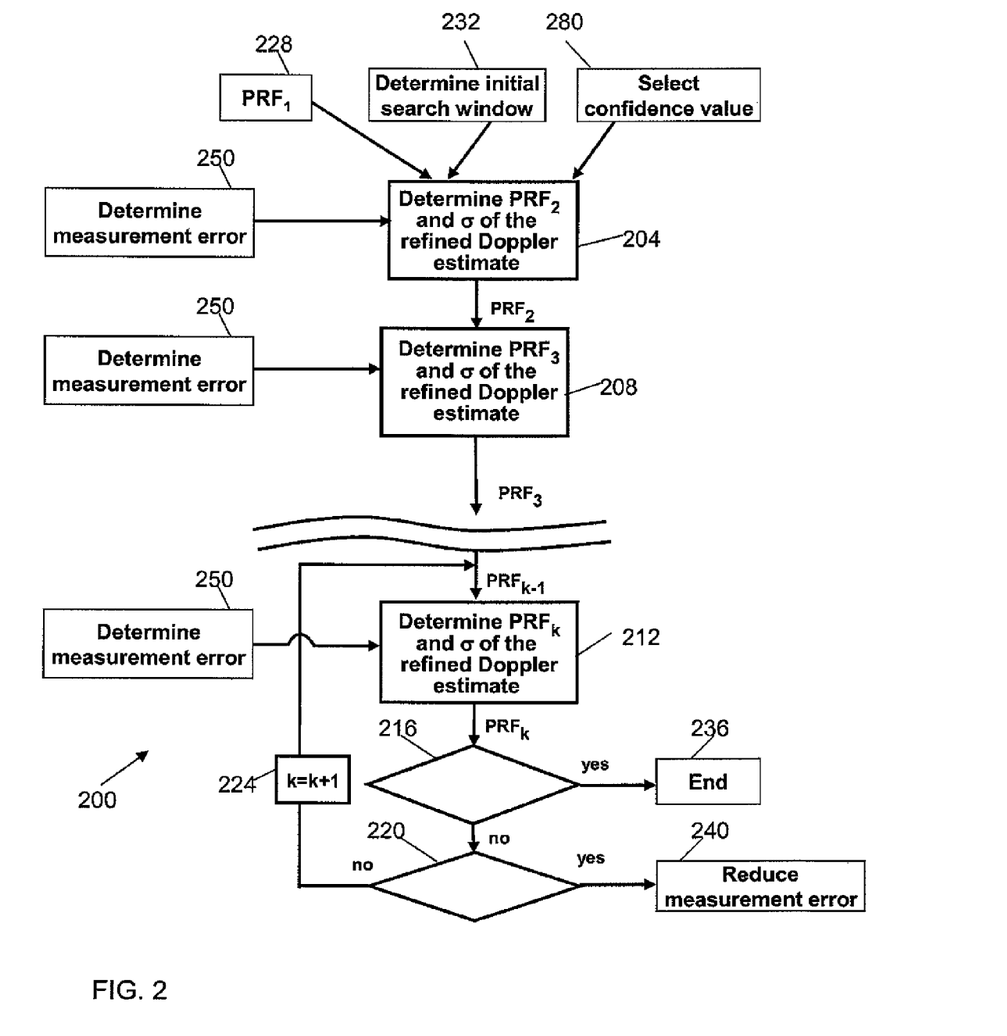
FIG. 2 is a flow diagram illustrating a method for determining pulse repetition frequency values and pulse repetition interval values, according to an illustrative embodiment.
Figure 3:
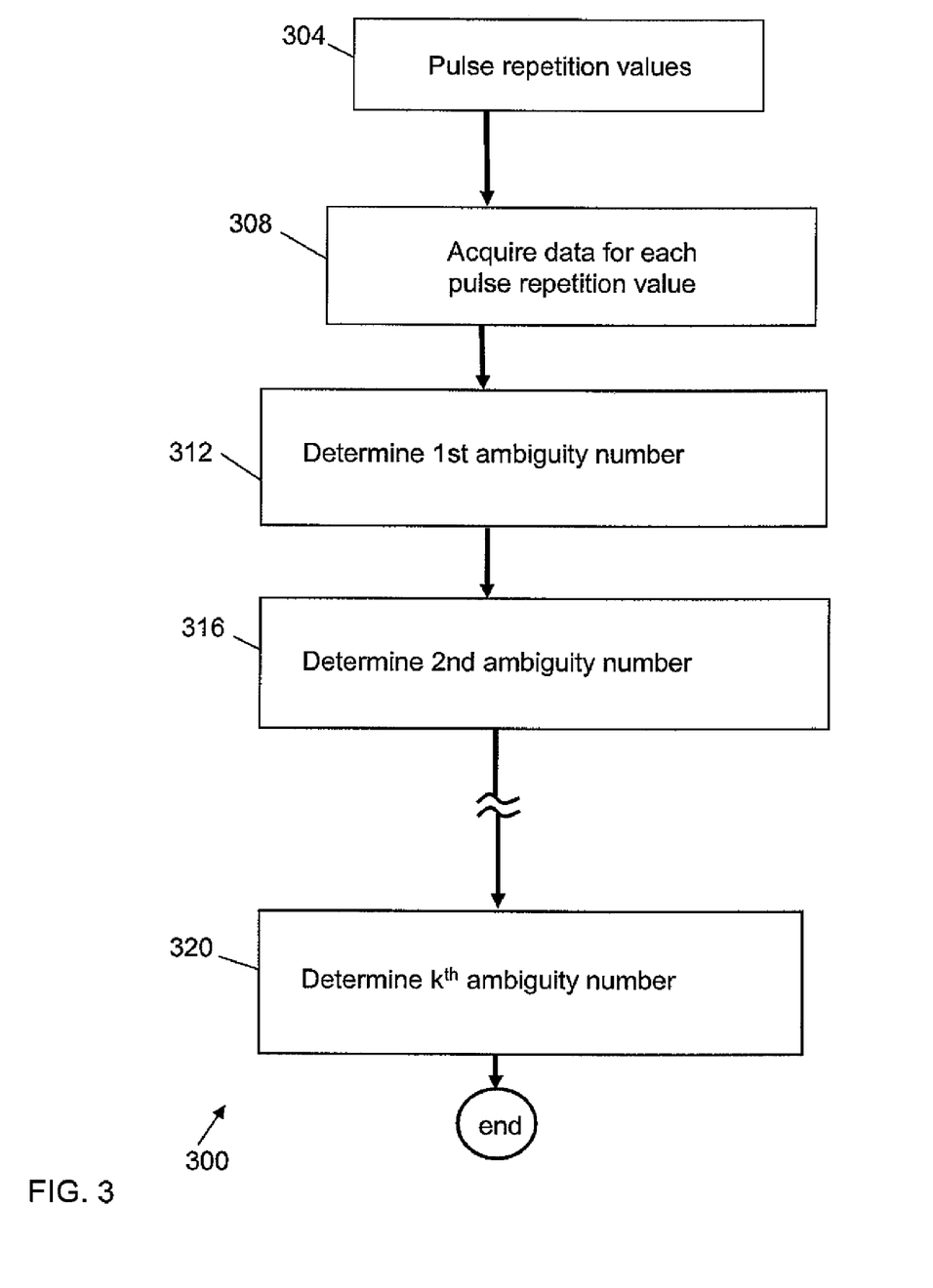
FIG. 3 is a flow diagram illustrating a method for estimating ambiguity parameter values of a target for radar, lidar or acoustic systems, according to an illustrative embodiment.

FIGS. 2 and 3 are flow diagrams illustrating an exemplary method for determining the ambiguity parameter values that, in some embodiments, are processed using the exemplary processor 116 of FIG. 1.

FIG. 2 is a flow diagram illustrating a method 200 for determining pulse repetition frequency values (generally, PRF) and pulse repetition interval values (generally, PRI) of a system (e.g., a radar, acoustic, lidar, or synthetic aperture imaging system), according to an illustrative embodiment. The method 100 includes determining (step 250) a measurement error value ($\sigma_{\tau}$ or $\sigma_{f}$) (e.g., statistical variation parameter value of the measurement (e.g., modulo range, Doppler or Doppler centroid of a target).

In some embodiments, $\sigma_{\tau}$ or $\sigma_{f}$ are inversely proportional to the bandwidth and time interval of the transmitted pulses, respectively. In some embodiments, $\sigma_{\tau}$ or $\sigma_{f}$ can be derived from, for example, the statistical property of an extended target (e.g., large or complicated targets consisting of many targets) or clutter (e.g., when the target is surface terrain). Exemplary method for determining these properties are described in "Doppler Frequency Estimation and the Cramer-Rao Bound", Richard Bamler, IEEE Transactions on Geoscience and Remote Sensing, Vol 29, No. 3, May 1991; the entire contents of which hereby incorporated by reference.

The method 200 also includes determining (step 232) an initial search window for the system. In one embodiment, the initial search window is an initial Doppler search window ($2N_\sigma \sigma_{f_{dc}^1}$) having a center at $f_{dc}^1$. Where $f_{dc}^1$ is the initial Doppler centroid estimate, where $$f_{dc}^1 = \frac{2\vec{V}_{ac} \cdot \hat{p}}{\lambda},$$

where $\vec{V}_{ac}$ is the aircraft velocity vector, $\hat{p}$ is the unit pointing vector from aircraft to the ground, and $\lambda$ is the wavelength of the carrier frequency of the radar pulse; and $$\sigma_{f_{dc}^1} = \frac{2\sigma_{|\vec{V}_{ac}| \cdot \hat{p}}}{\lambda}.$$

The method 200 also includes determining an initial pulse repetition value (step 228) which, in this embodiment, is an initial pulse repetition frequency value ($PRF_1$). $PRF_1$ is the largest among the PRF values selected from this process. Therefore, $PRF_1$ is selected near the maximum of all PRF values satisfying system/mode design requirements. Exemplary methods for selecting PRF values are described in, for example, U.S. Pat. No. 4,057,800, entitled "Multi-PRF signal processor system," and Section 6.5.2 of "Synthetic Aperture Radar Systems and Signal Processing," by Curlander et al.; the entire contents of both of which are hereby incorporated by reference.

The initial pulse repetition value ($PRF_1$), initial Doppler search window ($2N_\sigma \sigma_{f_{dc}^1}$), and statistical variation parameter value ($\sigma_{\tilde{f}}$) are used to determine (step 204) a new pulse repetition value ($PRF_2$) and the standard deviation ($\sigma_{f_{dc}^2}$) of a refined variation of the Doppler estimate ($\sigma_{f_{dc}^k}$) in accordance with the following:

$$N_2 \geq \frac{2N_\sigma \sigma_{f_{dc}^1}}{PRF_1} \qquad \text{EQN. 1}$$

where $N_2$ is a positive rational number, $$PRF_2 = N_2 \frac{PRF_1}{(N_2 + 1)}; \qquad \text{EQN. 2}$$

This produces a second PRF value smaller than the first one since $N_2/(N_2+1)<1$.

$$\sigma_{f_{dc}^2} = \left(\sqrt{\left(1 + \frac{1}{N_2}\right)^2 + 1}\right) N_2 \sigma_{\tilde{f}} \qquad \text{EQN. 3}$$

where $\sigma_{\tilde{f}}$ represents the standard deviation of both modulo Doppler estimate $\tilde{f}_1$ and $\tilde{f}_2$.

The method 200 involves an iterative calculation process in which, for example, a third pulse repetition frequency value ($PRF_3$) is determined (step 208) based on the following:

$$N_3 \geq \frac{2N_\sigma \sigma_{f_{dc}^2}}{PRF_1} \text{ and } N_3 < N_2 \qquad \text{EQN. 4}$$

$$PRF_3 = N_3 \frac{PRF_1}{(N_3 + 1)} \qquad \text{EQN. 5}$$

$$\sigma_{f_{dc}^3} = \left(\sqrt{\left(1 + \frac{1}{N_3}\right)^2 + 1}\right) N_3 \sigma_{\tilde{f}} \qquad \text{EQN. 6}$$

where the statistical variation parameter value ($\sigma_{\tilde{f}}$) 250 for each calculation step is generally, but is not necessarily or required to be, the same. In addition, $N_\sigma$ is a measure of the confidence that a given signal value will be within the search window (e.g., Doppler search window). $N_\sigma$ is selected by, an operator or automatically by a processor (Step 280).

In one embodiment, $N_\sigma$ is determined using the Q-function (a tail integral of a unit-Gaussian probability density function (pdf) defined by:

$$N_\sigma = 1 - 2Q(\sigma)$$

$$Q(\sigma) \equiv \int_\sigma^\infty \frac{1}{\sqrt{2\pi}} e^{\frac{-x^2}{2}} dx$$

For example, for a value $N_\sigma=3$, the actual Doppler centroid will be 99.73% within the search window. For a value $N_\sigma=6$, the actual Doppler centroid will be 99.9999998026% within the search window.

The method 200 involves, generally, repeating the previous calculations based on the following:

$$N_k \geq \frac{2N_\sigma \sigma_{f_{dc}^{k-1}}}{PRF_1} \text{ and } N_k < N_{k-1} \qquad \text{EQN. 7}$$

$$PRF_k = N_k \frac{PRF_1}{(N_k + 1)} \qquad \text{EQN. 8}$$

$$\sigma_{f_{dc}^k} = \left(\sqrt{\left(1 + \frac{1}{N_k}\right)^2 + 1}\right) N_k \sigma_{\tilde{f}} \qquad \text{EQN. 9}$$

until it is determined (step 216) that $$2N_\sigma \sigma_{f_{dc}^k} < PRF_1. \qquad \text{EQN. 10}$$

When $2N_\sigma \sigma_{f_{dc}^k} < PRF_1$, the method 200 is complete (step 236) and the complete set of pulse repetition frequency values have been generated for subsequent processing (e.g., complete set of pulse repetition frequency values [$PRF_1$, $PRF_2 \ldots PRF_k$]). When $2N_\sigma \sigma_{f_{dc}^k}$ is not less than $PRF_1$, the method 200 includes determining (step 220) if $$\sigma_{f_{dc}^k} \geq \sigma_{f_{dc}^{k-1}}. \qquad \text{EQN. 11}$$

When $\sigma_{f_{dc}^k}$ is not greater than or equal to $\sigma_{f_{dc}^{k-1}}$, the method includes incrementing k [k=k+1] (step 224) and then repeating step 212. When $\sigma_{f_{dc}^k} \geq \sigma_{f_{dc}^{k-1}}$, a satisfactory solution has not been identified and it is necessary to reduce the statistical variation parameter value ($\sigma_{\tilde{f}}$) (step 240). The statistical variation parameter value $\sigma_{\tilde{f}}$ can be reduced by, for example, acquiring a larger amount of radar data by employing more pulses in each $PRF_k$.

EQNS. 1-11 illustrate application of the method of FIG. 2 in which the method is used for determining pulse repetition frequency values ($PRF_k$) to determine Doppler centroid ambiguity parameter values. The method of FIG. 2 is equally applicable to range and Doppler applications. In range applications, the variable $PRF_k$ is replaced with $PRI_k$ (pulse repetition interval values) and the Doppler centroid estimate ($f_{dc}^k$) is replaced by the range estimate ($r^k$). In Doppler applications, the Doppler centroid estimate ($f_{dc}^k$) is replaced by the Doppler estimate ($f_d^k$).

FIG. 3 is a flow diagram illustrating a method 300 for estimating ambiguity parameter values of a target for a radar, lidar, acoustic or synthetic aperture imaging system, according to an illustrative embodiment. The method 300 includes receiving (step 304) pulse repetition values (e.g., [$PRF_1$, $PRF_2 \ldots PRF_k$] from, for example, the method 200 of FIG. 2).

The system (e.g., radar system) acquires (step 308) radar data (e.g., $[\bar{f}_1, \bar{f}_2 \ldots \bar{f}_k]$) for each pulse repetition value (e.g., $[PRF_1, PRF_2 \ldots PRF_k]$).

In one embodiment, the radar data (e.g., $[\bar{f}_1, \bar{f}_2 \ldots \bar{f}_k]$) from the returned radar signal pulses of $PRF_k$ are range compressed to improve range resolution. Range compression is a wave-shaping process in which a radar pulse is frequency modulated to resolve the range of targets which may have overlapping radar return signals. Then, a Fourier transform is performed on the radar data in the Doppler dimension to produce a spectrum. Sharp pulses are produced in the spectrum if the radar detects a small bright target. Broad hill shapes are produced in the spectrum if there is a large ground return signal. In both cases, the data is smoothed in the frequency dimension. Then, the frequency associated with a peak of the spectrum is determined to be either the target Doppler or the Doppler centroid of the ground.

The method 300 also includes determining (step 312) the $1^{st}$ ambiguity parameter value $N_{PRF_1}$ in accordance with:

$$\text{bias} = \frac{\text{mod}\left[f_{dc}^1 - \frac{N_2}{2}PRF_1, N_2 PRF_1\right]}{N_2 PRF_1} \quad \text{EQN. 12}$$

$$p = -\frac{1}{2} + \text{mod}\left[\frac{\bar{f}_2}{PRF_2} - \frac{\bar{f}_1}{PRF_1} - \text{bias}, 1\right] \quad \text{EQN. 13}$$

$$f_{dc}^2 = pN_2 PRF_1 + f_{dc}^1 \quad \text{EQN. 14}$$

$$N_{PRF_1} = \text{Floor}\left(\frac{f_{dc}^2}{PRF_1}\right) \quad \text{EQN. 15}$$

where $f_{dc}^k$ is the Doppler centroid estimate ($f_{dc}^1$ the initial Doppler centroid estimate). The mathematical function (Floor) returns the next smallest integer value. Alternative mathematical functions are used in other embodiments. In some embodiments, the mathematical function (Ceiling) is used, and returns the next highest integer value.

The method 300 also includes determining (step 316) the $2^{nd}$ ambiguity parameter value in accordance with:

$$\text{bias} = \frac{\text{mod}\left[f_{dc}^2 - \frac{N_2}{2}PRF_1, N_3 PRF_1\right]}{N_3 PRF_1} \quad \text{EQN. 16}$$

$$p = -\frac{1}{2} + \text{mod}\left[\frac{\bar{f}_3}{PRF_3} - \frac{\bar{f}_1}{PRF_1} - \text{bias}, 1\right] \quad \text{EQN. 17}$$

$$f_{dc}^3 = pN_3 PRF_1 + f_{dc}^2 \quad \text{EQN. 18}$$

$$N_{PRF_2} = \text{Floor}\left(\frac{f_{dc}^3}{PRF_1}\right) \quad \text{EQN. 19}$$

The method 300 is continued for each ambiguity number, and ($N_{PRF_k}$) is determined (step 320) in accordance with:

$$\text{bias} = \frac{\text{mod}\left[f_{dc}^k - \frac{N_k}{2}PRF_1, N_k PRF_1\right]}{N_k PRF_1} \quad \text{EQN. 20}$$

$$p = -\frac{1}{2} + \text{mod}\left[\frac{\bar{f}_k}{PFR_k} - \frac{\bar{f}_k}{PFR_1} - \text{bias}, 1\right] \quad \text{EQN. 21}$$

$$f_{dc}^k = pN_k PRF_1 + f_{dc}^{k-1} \quad \text{EQN. 22}$$

$$N_{PRF_k} = \text{Floor}\left(\frac{f_{dc}^k}{PRF_1}\right) \quad \text{EQN. 23}$$

By way of illustration, a simulation was conducted using the methods of FIGS. 2 and 3 to determine the Doppler ambiguity parameter value ($N_{PRF}$). The simulation was conducted assuming:

$PRF_1 = 3800$ Hz, $f_{dc}^1 = 2679.2 \cdot PRF_1$ (the initial Doppler centroid based on assumed navigation data for the simulation, where the navigation data includes the position and velocity of the aircraft, which also include the radar pointing data $\hat{p}$), $N_o = 6$ (and, therefore, the initial Doppler search window $F_\Omega = 6 \cdot \sigma_{f_{dc}^1} = 30 \cdot PRF_1$) (in this simulation, $\sigma_{f_{dc}^1} = 5 \cdot PRF_1$ and $N_o = 3$), $PRF_2$ is chosen to be $$\frac{34}{35} PRF_1,$$

and $\sigma_f = 0$ Hz.

Figure 4A:
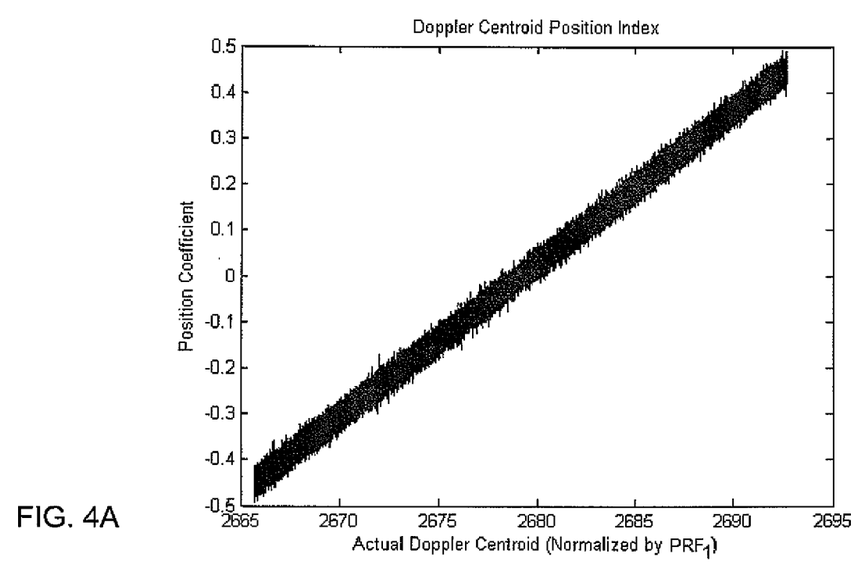
FIGS. 4A-4F are graphical illustrations of ambiguity parameter value estimates determined using apparatus and methods that incorporate principles of various embodiments.
Figure 4B:
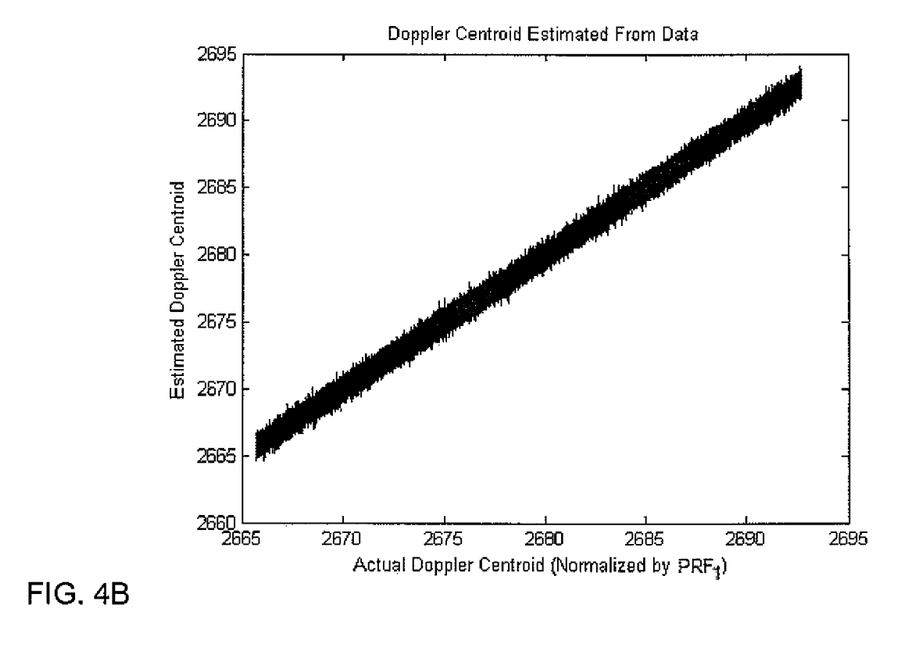
Figure 4C:
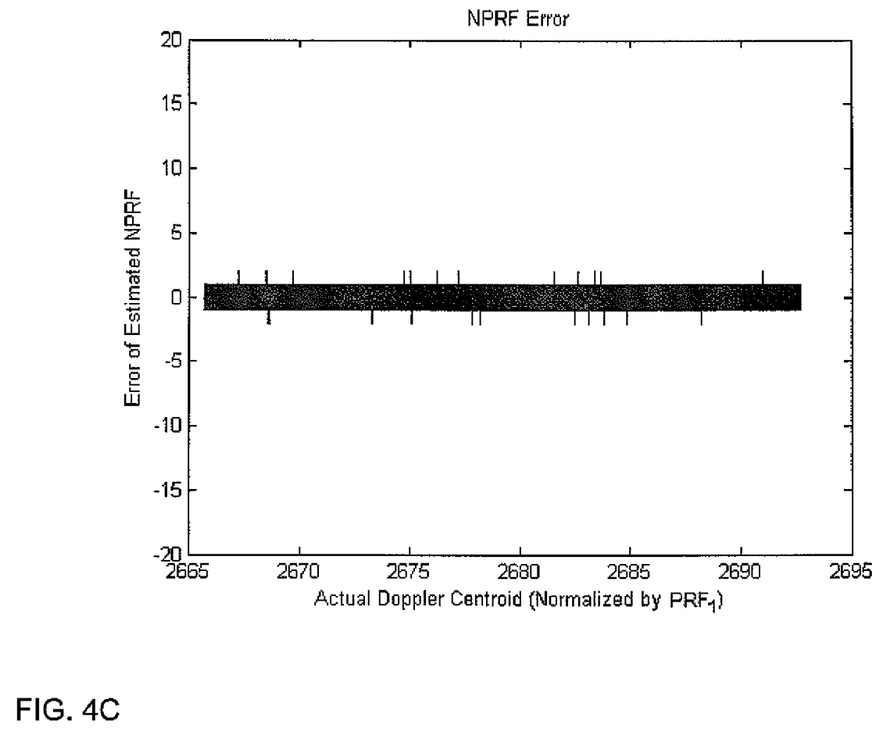

In this simulation, there are 120,000 data points with the actual Doppler centroid uniformly distributed within an initial Doppler search window ($2N_o \sigma_{f_{dc}^1} = 30 \cdot PRF_1$). In each case, the Doppler centroid is added by a Gaussian random number representing the baseband Doppler estimation error with $\sigma_f = 50$ Hz. The $1^{st}$ stage estimate of the Doppler centroid position coefficient, the estimated absolute Doppler centroid, and the error of the Doppler ambiguity number (each normalized by $PRF_1$) are illustrated in FIGS. 4A, 4B and 4C, respectively. The Doppler ambiguity number plot (FIG. 4C) shows the error of the Doppler ambiguity number calculation is falling into the integer set of −2, −1, 1, and 2.

Figure 4D:
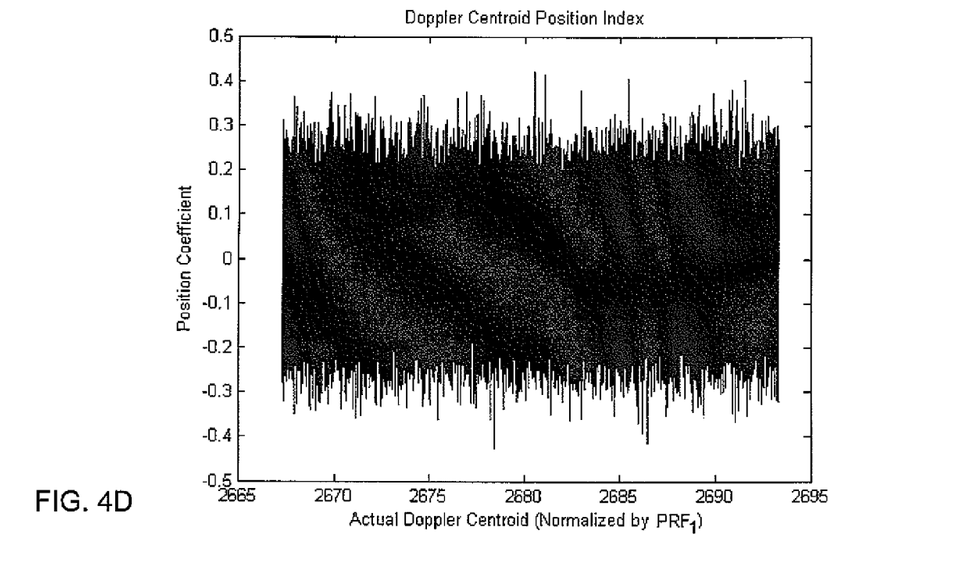
Figure 4E:
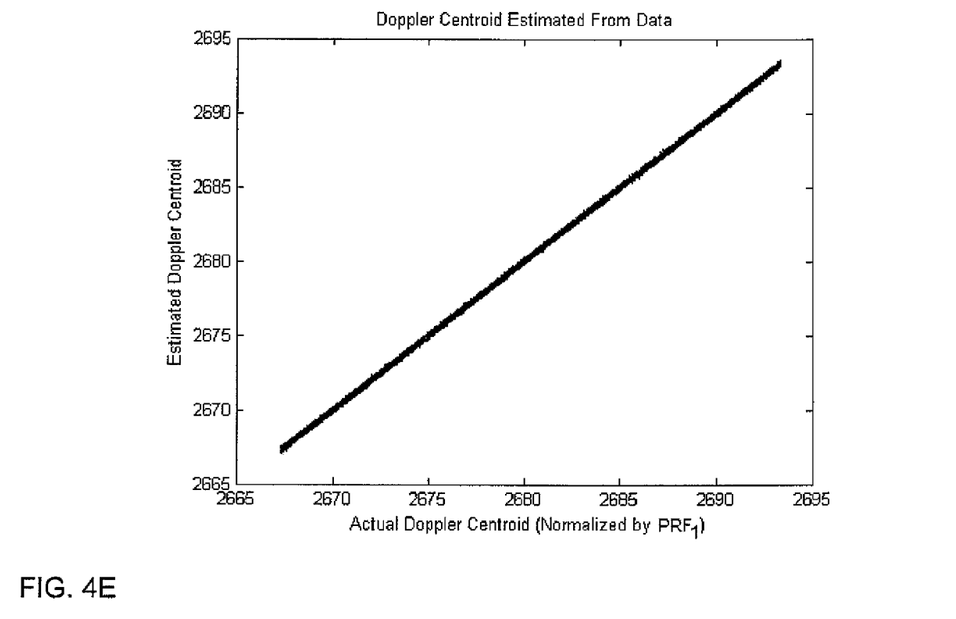
Figure 4F:
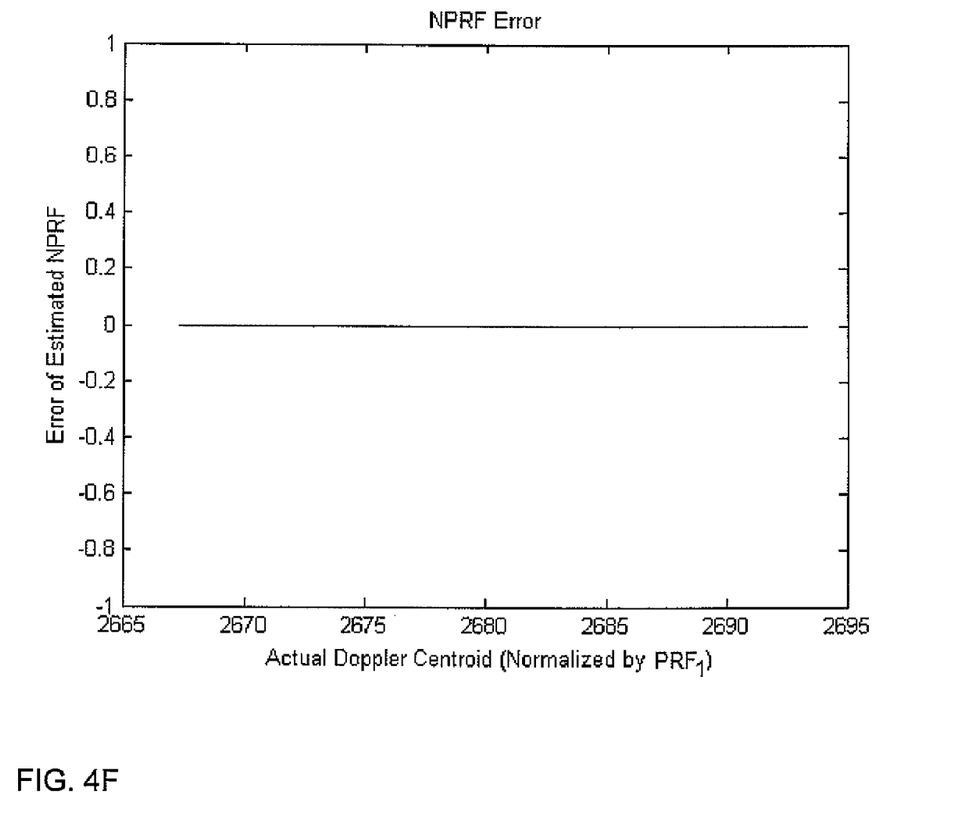

In the $2^{nd}$ stage, $PRF_3$ is chosen to be $$\frac{5}{6} PRF_1.$$

The $2^{nd}$ stage estimate of the Doppler centroid position coefficient, the estimated absolute Doppler centroid, and the error of the Doppler ambiguity number (each normalized by $PRF_1$) are illustrated in FIGS. 4D, 4E and 4F, respectively. The Doppler ambiguity number plot (FIG. 4F) shows the error of the Doppler ambiguity number calculation is an integer equal to 0.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for estimating a range ambiguity parameter value ($N_{PRI}$) of a target for a radar, lidar, or acoustic system, comprising:
   determining a statistical variation parameter value ($\sigma_{r^1}$) of an initial range estimate $r^1$ of a target for a radar, lidar, or acoustic system;
   determining k pulse repetition interval values (PRI) for the radar, lidar, or acoustic system; and
   determining a range estimate ($r^k$) for each of the k PRI values based on the k−1$^{th}$ range estimate ($r^{k-1}$) of the k−1$^{th}$ PRI value and modulo range estimates ($\bar{r}_1$ and $\bar{r}_k$) determined from radar, lidar, or acoustic system data sets acquired for pulse repetition interval values $PRI_1$ and $PRI_k$.

2. The method of claim 1, comprising determining the range ambiguity parameter value ($N_{PRI}$) based on at least the $k^{th}$ range estimate ($r^k$) and 1$^{st}$ pulse repetition interval value ($PRI_1$).

3. The method of claim 2, comprising determining the range ambiguity parameter value ($N_{PRI}$) in accordance with equation:

$$N_{PRI} = \text{floor}\left(\frac{r^k}{PRI_1}\right).$$

4. The method of claim 1, wherein determining the $k^{th}$ pulse repetition interval ($PRI_k$) values comprises calculating the $k^{th}$ pulse repetition interval (PRI) values in accordance with equation:

$$PRI_k = N_k\left(\frac{PRI_1}{N_k+1}\right)$$

for each value of k, until $2N_o\sigma_{r^k} < PRI_1$, where, $$N_k \geq 2N_\sigma \frac{\sigma_{r^{k-1}}}{PRI_1} \text{ and } N_k < N_{k-1}$$

$$\sigma_{r^k} = \left(\sqrt{\left(1+\frac{1}{N_k}\right)^2 + 1}\right)N_k\sigma_{\tilde{r}},$$

and, $\sigma_{\tilde{r}}$ is a is a measurement error value.

5. The method of claim 3, wherein determining the $k^{th}$ range estimate ($r^k$) is calculated in accordance with equation:

$$r^k = pN_k PRI_1 + r^{k-1}$$

where, $$p = -\frac{1}{2} + \text{mod}\left[\frac{\tilde{r}_k}{PRI_k} - \frac{\tilde{r}_1}{PRI_1} - \text{bias}, 1\right], \text{ and}$$

$$\text{bias} = \frac{\text{mod}\left[r^1 - \frac{N_k}{2}PRI_1, N_k PRI_1\right]}{N_k PRI_1}.$$

6. A method for estimating a Doppler ambiguity parameter value ($N_{PRF}$) of a target for a radar, lidar, or acoustic system, comprising:
   determining a statistical variation parameter value ($\sigma_{f_d^1}$) of an initial Doppler estimate $f_d^1$ of a target for a radar, lidar, or acoustic system;
   determining k pulse repetition frequency values (PRF) for the radar, lidar, or acoustic system; and
   determining a Doppler estimate ($f_d^k$) for each of the k PRF values based on the $k-1^{th}$ Doppler estimate ($f_d^{k-1}$) of the $k-1^{th}$ PRF value and modulo Doppler estimates ($\tilde{f}_1$ and $\tilde{f}_k$) determined from radar, lidar, or acoustic system data sets acquired for pulse repetition frequency values $PRF_1$ and $PRF_k$.

7. The method of claim 6, comprising determining the Doppler ambiguity parameter value ($N_{PRF}$) based on at least the $k^{th}$ Doppler estimate ($f_d^k$) and $1^{st}$ pulse repetition frequency value ($PRF_1$).

8. The method of claim 7, comprising determining the Doppler ambiguity parameter value ($N_{PRF}$) in accordance with equation:

$$N_{PRF} = \text{floor}\left(\frac{f_d^k}{PRF_1}\right).$$

9. The method of claim 6, wherein determining the $k^{th}$ pulse repetition frequency ($PRF_k$) values comprises calculating the $k^{th}$ pulse repetition frequency ($PRF_k$) values in accordance with equation:

$$PRF_k = N_k\left(\frac{PRF_1}{N_k+1}\right)$$

for each value of k, until $2N_o\sigma_{f_d^k} < PRF_1$, where, $$N_k \geq 2N_\sigma \frac{\sigma_{f_d^{k-1}}}{PRF_1} \text{ and } N_k < N_{k-1}$$

$$\sigma_{f_d^k} = \left(\sqrt{\left(1+\frac{1}{N_k}\right)^2 + 1}\right)N_k\sigma_{\tilde{f}},$$

and $\sigma_{\tilde{f}}$ is a measurement error value.

10. The method of claim 6, wherein determining the $k^{th}$ Doppler estimate ($f_d^k$) is calculated in accordance with equation:

$$f_d^k = pN_k PRF_1 + f_d^{k-1}$$

where, $$p = -\frac{1}{2} + \text{mod}\left[\frac{\tilde{f}_k}{PRF_k} - \frac{\tilde{f}_1}{PRF_1} - \text{bias}, 1\right], \text{ and}$$

$$\text{bias} = \frac{\text{mod}\left[f_{dc}^1 - \frac{N_k}{2}PRF_1, N_k PRF_1\right]}{N_k PRF_1}.$$

11. A method for estimating a Doppler ambiguity parameter value ($N_{PRF}$) for a synthetic aperture imaging system, comprising:
   determining a statistical variation parameter value ($\sigma_{f_{dc}^1}$) of an initial Doppler centroid estimate $f_{dc}^1$ of a target for a synthetic aperture imaging system;
   determining k pulse repetition frequency values (PRF) for the synthetic aperture imaging system; and
   determining a Doppler centroid estimate ($f_{dc}^k$) for each of the k PRF values based on the $k-1^{th}$ Doppler centroid estimate ($f_{dc}^{k-1}$) of the $k-1^{th}$ PRF value and modulo Doppler estimates ($\tilde{f}_1$ and $\tilde{f}_k$) determined from imaging system data sets acquired for pulse repetition frequency values $PRF_1$ and $PRF_k$.

12. The method of claim 11, comprising determining the Doppler ambiguity parameter value ($N_{PRF}$) based on at least the $k^{th}$ Doppler centroid estimate ($f_{dc}^k$) and $1^{st}$ pulse repetition frequency value ($PRF_1$).

13. The method of claim 12, comprising determining the Doppler ambiguity parameter value ($N_{PRF}$) in accordance with equation:

$$N_{PRF} = \text{floor}\left(\frac{f_{dc}^k}{PRF_1}\right).$$

14. The method of claim 11, wherein determining the k pulse repetition frequency ($PRF_k$) values comprises calculating the k pulse repetition frequency ($PRF_k$) values in accordance with equation:

$$PRF_k = N_k \left( \frac{PRF_1}{N_k + 1} \right)$$

for each value of k, until $2N_o \sigma_{f_{dc}^k} < PRF_1$, where, $$N_k \geq 2N_\sigma \frac{\sigma_{f_{dc}^{k-1}}}{PRF_1} \text{ and } N_k < N_{k-1}$$

$$\sigma_{f_{dc}^k} = \left( \sqrt{\left(1 + \frac{1}{N_k}\right)^2 + 1} \right) N_k \sigma_{\bar{f}},$$

and $\sigma_{\bar{f}}$ is a measurement error value.

15. The method of claim 11, wherein determining the $k^{th}$ Doppler centroid estimate ($f_{dc}^k$) is calculated in accordance with equation:

$$f_{dc}^k = pN_k PRF_1 + f_{dc}^{k-1}$$

where, $$p = -\frac{1}{2} + \text{mod}\left[ \frac{\bar{f}_k}{PRF_k} - \frac{\bar{f}_1}{PRF_1} - \text{bias}, 1 \right], \text{ and}$$

$$\text{bias} = \frac{\text{mod}\left[ f_{dc}^1 - \frac{N_k}{2} PRF_1, N_k PRF_1 \right]}{N_k PRF_1}.$$

16. The method of claim 11, wherein the synthetic aperture imaging system is a radar system, lidar system, or acoustic system.

17. A synthetic aperture imaging system, comprising:
a transmitter;
a receiver;
a processor coupled to the receiver and transmitter configured to:
  determine a statistical variation parameter value ($\sigma_{f_{dc}^1}$) of an initial Doppler centroid estimate $f_{dc}^1$ for the synthetic aperture imaging system;
  determine k pulse repetition frequency values (PRF) for the synthetic aperture imaging system; and
  determine a $k^{th}$ Doppler centroid estimate ($f_{dc}^k$) for each of the k PRF values based on the $k-1^{th}$ Doppler centroid estimate ($f_{dc}^{k-1}$) of the $k-1^{th}$ PRF value and modulo Doppler estimates ($\bar{f}_1$ and $\bar{f}_k$) determined from imaging system data sets acquired for pulse repetition frequency values $PRF_1$ and $PRF_k$.

18. A synthetic aperture imaging system, comprising:
means for determining a statistical variation parameter value ($\sigma_{f_{dc}^1}$) of an initial Doppler centroid estimate $f_{dc}^1$ for a synthetic aperture imaging system;
means for determining k pulse repetition frequency values (PRF) for the synthetic aperture imaging system; and
means for determining a Doppler centroid estimate ($f_{dc}^k$) for each of the k PRF values based on the $k-1^{th}$ Doppler centroid estimate ($f_{dc}^{k-1}$) of the $k-1^{th}$ PRF value and modulo Doppler estimates ($\bar{f}_1$ and $\bar{f}_k$) determined from imaging system data sets acquired for pulse repetition frequency values $PRF_1$ and $PRF_k$.

* * * * *